United States Patent [19]

Schwärzler et al.

[11] Patent Number: 5,660,494
[45] Date of Patent: Aug. 26, 1997

[54] CONNECTION FOR THE HARMONIC TRANSMISSION OF TORQUE

[75] Inventors: Peter Schwärzler, Glattbach; Friedhelm John, Obertshausen, both of Germany

[73] Assignee: Löhr & Bromkamp GmbH, Offenbach am Main, Germany

[21] Appl. No.: 431,580

[22] Filed: May 1, 1995

[30] Foreign Application Priority Data

Apr. 29, 1994 [DE] Germany ............. 44 15 033.4

[51] Int. Cl.$^6$ .................................................. F16B 7/00
[52] U.S. Cl. ........................................................ 403/359
[58] Field of Search ........................ 74/462; 403/355, 403/356, 358, 359

[56] References Cited

U.S. PATENT DOCUMENTS

| | | | |
|---|---|---|---|
| 1,425,144 | 8/1922 | Schmick | 74/462 |
| 1,525,642 | 2/1925 | Cox | 74/462 |
| 2,228,770 | 1/1941 | Tourneau | 403/359 X |
| 2,844,013 | 7/1958 | Spence | 403/359 X |
| 3,661,031 | 5/1972 | Mizukoshi et al. | 74/462 |
| 4,115,022 | 9/1978 | Orain | 403/359 |
| 5,499,884 | 3/1996 | Kühnhold et al. | 403/359 |
| 5,503,494 | 4/1996 | Kamata et al. | 403/359 |

FOREIGN PATENT DOCUMENTS

| | | | |
|---|---|---|---|
| 6610411 | 1/1974 | Germany . | |
| 2323943 | 11/1974 | Germany | 403/359 |
| 2636382 | 7/1980 | Germany . | |

*Primary Examiner*—Blair Johnson
*Assistant Examiner*—Andrea Chop
*Attorney, Agent, or Firm*—Harness, Dickey & Pierce, P.L.C.

[57] ABSTRACT

A connection for transmitting torque between an internally toothed hub and an externally toothed shaft insertable into the hub has internal hub teeth and shaft teeth which are provided with different tooth flank profiles. The tooth flanks of the shaft teeth rest against the tooth flanks of the internal teeth on the pitch circle diameter $D_T$. Thus, off the pitch circle diameter a clearance exists between the tooth flanks and the circumferential direction. The shaft teeth at its end directed towards the shaft shank, include a run-out region with a tooth height $h_Z$ decreasing as a function of the axial direction. The run/out region of the shaft teeth is substantially positioned within the internal hub teeth with respect to both their axial extensions.

4 Claims, 2 Drawing Sheets

CONNECTION FOR THE HARMONIC TRANSMISSION OF TORQUE

BACKGROUND OF THE INVENTION

The invention relates to a connection for transmitting torque between an internally toothed hub and an externally toothed shaft insertable into the hub. The internal hub teeth and the shaft teeth are provided with different tooth flank profiles such that the tooth flanks of the shaft teeth rest against the tooth flanks of the internal teeth on a pitch circle diameter $D_T$. Thus, off the pitch circle diameter, a clearance between the tooth flanks exists in the circumferential direction.

When torque is transmitted by such connections, a torsional or shear stress occurs in the shaft. The stress reaches its maximum in the transition cross-section of the shaft at the hub end positioned towards the shaft shank. In the course of further axial extension of the shaft, stress is reduced within the hub. In conventional designs, the transition cross-section constitutes a critical area where the tooth profiles may be damaged or the shaft may be sheared off.

U.S. Pat. No. 4,115,022 describes a connection between a hub and a plugged-in shaft. Here the internal teeth of the hub and the shaft teeth are each provided with straight flanks and thus with similar profiles. The tooth form on the shaft teeth is such that the tooth thickness changes axially. The maximum tooth thickness occurs in the axially central region of the tooth, with the minimum tooth thickness occurring at the free shaft end and in the transition cross-section of the shaft shank at the hub end. The tooth form allows shaft torsion beyond the transition cross-section within the hub, thereby ensuring that the torsional load on the shaft is improved and more uniform and that the tooth flanks are subjected to a uniform load. In consequence, the risk of the tooth profiles being damaged and the shaft being sheared off in the transition cross-section is reduced.

However, such a shaft tooth profile whose thickness changes along the shaft axis requires an expensive machining operation. Furthermore, a shaft profile with straight tooth flanks is produced less advantageously than a shaft profile obtained as a result of rolling processes of tool and workpiece. Moreover, half of the axial length of the shaft teeth profile positioned towards the free end of the shaft remains load-free and unused.

SUMMARY OF THE INVENTION

It is an object of the invention to provide a connection via teeth, which is easy to produce and meets the requirements of a harmonious introduction of torque into the shaft. Also, the tooth length is to be used as fully as possible to transmit torque.

In achieving the objective, at its end directed towards the shaft shank, the shaft teeth include a run-out region with a tooth height $h_Z$ decreasing as a function of the axial direction. The run-out region of the shaft teeth, with respect to its axial extension, is substantially positioned within the internal teeth of the hub. The run-out region, in this case, refers to a region including less than the tooth height $h_{ZK}$ of the full shaft teeth profile. The width of the teeth as a function of the tooth height remains unchanged over the run-out region up to its respective maximum height.

Because of the clearance between the tooth flanks below the pitch circle diameter and the decreasing tooth height, any torque loading in a connection in accordance with the invention causes shaft torsion in the axial region within the hub up to a maximum degree at which the clearance is compensated for, and thus a homogeneous transmission of power between the shaft teeth and the internal hub teeth.

The above-described connection between a shaft and hub ensures that, in the region of the run-out, the tooth flank regions which, initially, are positioned opposite one another with a certain amount of circumferential clearance, contact one another at an axially decreasing tooth height as a result of the shaft torsion when load is applied. Uniformity of contact between internal and external teeth is decisively influenced by the curve of the axially extending profile run-out region which may be determined as a function of the following parameters:

function of the clearance between the tooth flanks as a function the radial direction;

shaft cross-section; and load on tooth profile.

By varying the curve of the profile run-out, it is possible to either achieve a gradual increase in profile contact, accompanied by an increase in the torsional moment, or additional uniform contact of a certain amount of profile length when a certain torsional moment has been reached.

In this way it is possible to achieve a longer, more effective, uniformly loaded tooth length. The uniform load on the tooth length reduces the shear stress in the transition cross-section at the hub end directed towards the shaft shank. The characteristics of the torque receiving means achieved in this way depend on the run-out angle α relative to the axial direction at which the tooth height changes axially from the major diameter to the base diameter.

A shaft embodiment where the base diameter $D_{FW}$ of the shaft teeth has at least the same dimension as the shaft diameter $D_W$ of the adjoining smooth shaft shank is advantageous with respect to its load bearing capacity because of the reduced notch effect at the end of he run-out region.

Apart from the advantages, the fact that the profile run-out extends as far as the shaft base diameter also has a positive effect on the notch effect for the transition cross-section of the profile to the shaft and thus also increases the load bearing capacity in this region. In particular, this applies to drawn profiles where, in state-of-the-art designs, as a rule, the profile run-out ends directly in the shaft material, as a result of which the notch effect becomes particularly pronounced. In the case of profile drawing, the advantage of a reduced notch effect is complemented by the fact that the drawing tool is drawn into the open, thereby providing the profile with the same cross-section over its entire length, which means that the profile can be used over its entire length (no need for tool introducing chambers).

On the one hand, the profile run-out contour can be produced by carrying out a recess grinding operation after completion of the profile. On the other hand, it may be produced by turning, forging or forming a pre-contour prior to producing the profile, and by subsequent profile rolling or profile drawing.

According to a preferred embodiment, the tooth flanks of the internal teeth of the hub are provided in the form of straight flanked teeth and the tooth flanks of the shaft teeth in the form of involute teeth. In this way, an adequate clearance is obtained between the tooth flank faces, as a result of which the shaft is able to accommodate a correspondingly large amount of torsion. Furthermore, from the point of view of production technology, this combination of teeth profiles is advantageous to produce.

An advantageous embodiment of shaft teeth is obtained if the tooth height in the run-out region in the region of the tooth portion below the pitch circle diameter changes into the tooth form diameter and the shaft shank at a maximum run-out angle α of 10°. This measure ensures an optimum load bearing capacity in the region of transition, as a result of which the notch effect remains low, and shear stress peaks are avoided. In a preferred embodiment the run-out angle α is no greater than three to four (3°–4°) degrees maximum.

According to a further advantageous embodiment, the entire run-out region, starting with the tooth height positioned at the major diameter of the full profile, the external teeth of the shaft change into the tooth form diameter and shaft shank at a continuously changing run-out angle α. In this way, the run-out function of the shaft is easy to achieve by production-technical means.

BRIEF DESCRIPTION OF THE DRAWINGS

A preferred embodiment of a connection in accordance with the invention is illustrated in the drawing wherein.

DETAILED DESCRIPTION OF THE PREFERRED EMBODIMENT

Figure 1:
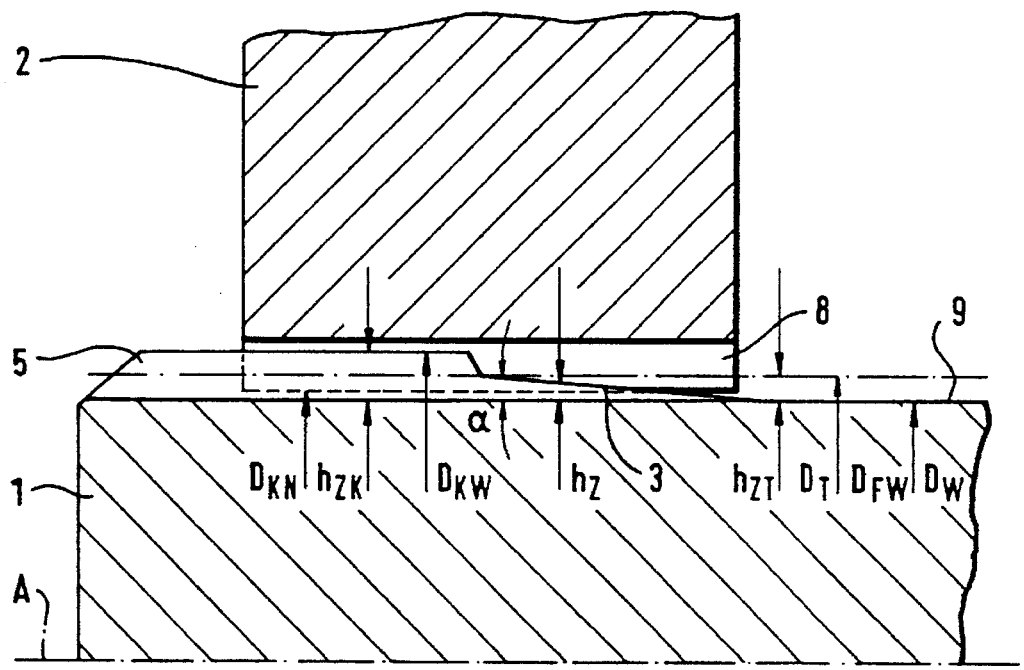
FIG. 1 is half a longitudinal section view through a connection in accordance with the invention.

FIG. 1 shows a connection between an externally toothed shaft 1 and a hub 2. The shaft teeth are provided with a run-out region 3 at the teeth end directed towards the shaft shank 9. The run-out region includes a tooth height $h_Z$ which continuously decreases as a function of the axial direction. The tooth cross-section within the internal teeth 8 of the hub 2 remain unchanged. The shaft teeth 5, with reference to the shaft axis A, includes a major diameter $D_{KW}$, a pitch circle diameter $D_T$ and a base diameter $D_{FW}$. The base diameter $D_{FW}$ has the same dimension as the shaft diameter $D_W$ of the smooth shaft shank 9. $h_{ZK}$ refers to the tooth height of the full shaft teeth profile, which is determined by the major diameter $D_{KW}$. $h_{ZT}$ refers to the tooth height defined by the pitch circle diameter $D_T$ and $h_Z$ to the tooth height of the run-out region 3 in general. The major diameter $D_{KN}$ of the internal teeth of the hub is marked as well.

Figure 2:
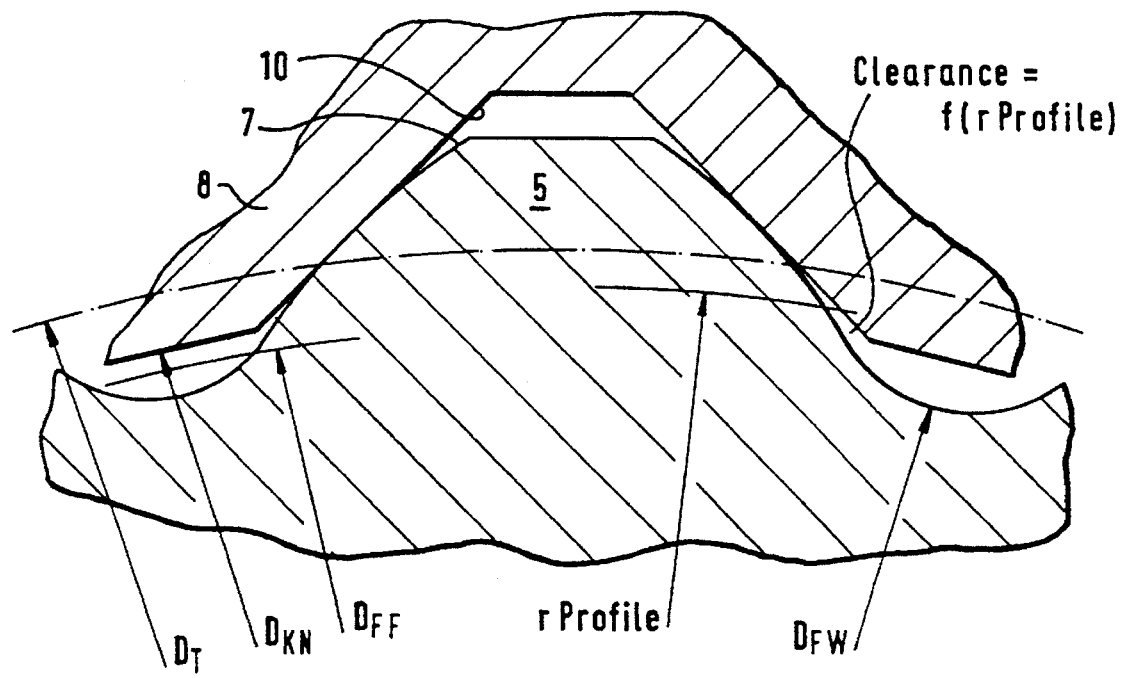
FIG. 2 is a partial cross-section view through a tooth in a connection in accordance with the invention.

FIG. 2 shows part of a cross-section through a connection, showing the tooth of a set of shaft teeth 5, which is positioned in a tooth gap of the internal teeth 8. The shaft teeth 5 are of the involute type and the internal teeth 8 are of the straight type. The tooth flank faces 10, 7 contact one another in the pitch circle diameter $D_T$, thereby producing a clearance S=f (rProfile) on both sides between the tooth flank faces 10, 7 (rProfile) as marked by the specific sample. Furthermore the pitch circle diameter $D_T$, the major diameter $D_{KN}$ of the internal teeth of the hub, the form diameter $D_{FF}$, which is the base of the involute type shaft teeth, and the base diameter $D_{FW}$ of the shaft teeth as marked.

Figure 3:
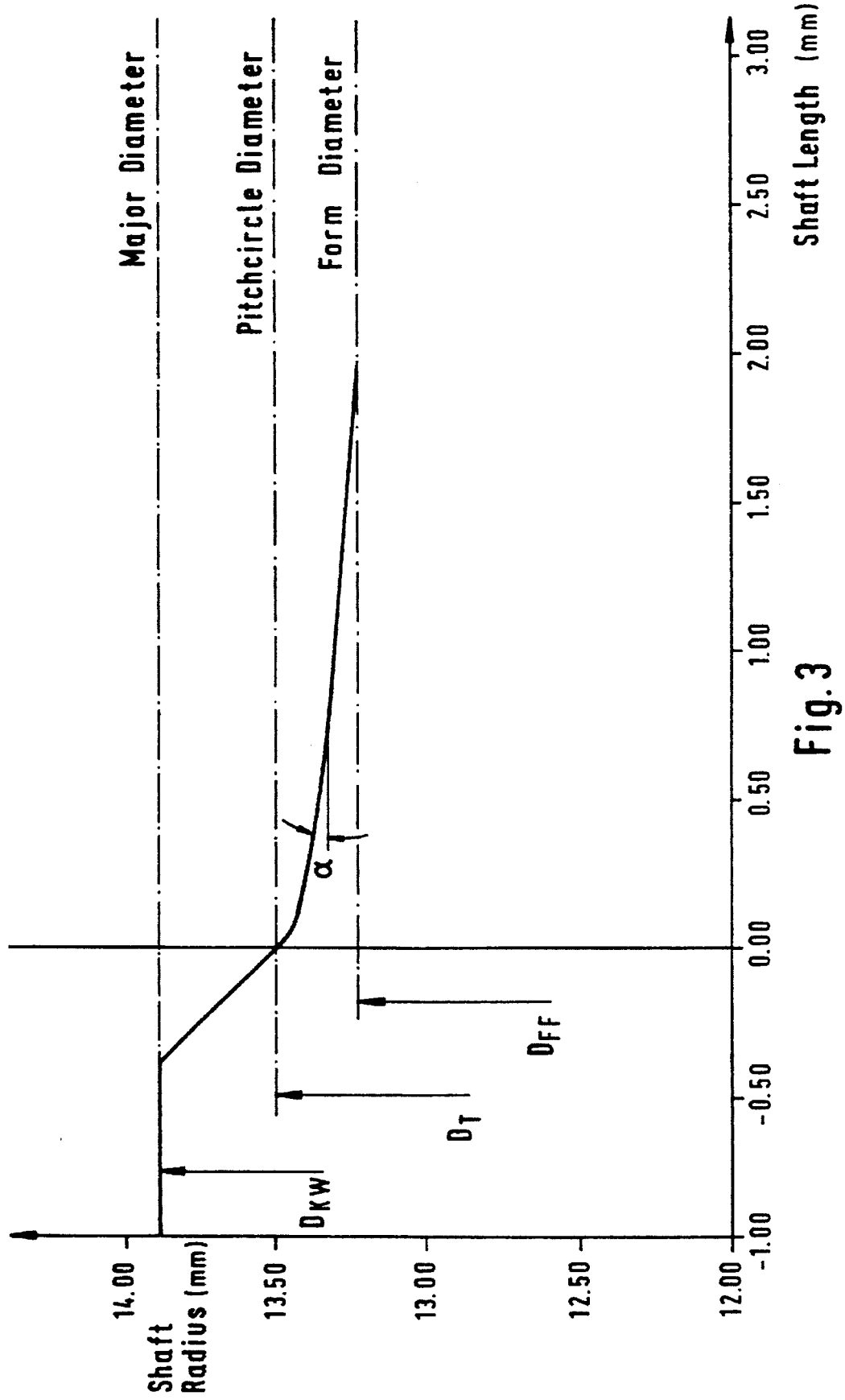
FIG. 3 illustrates an example, in the form of a curve, for dimensioning the run-out region of the shaft toothing in accordance with the invention.

FIG. 3, as a function of the axial direction, shows the extension of the tooth height $h_Z$ of the shaft teeth starting with the major diameter $D_{KW}$ across the pitch circle diameter $D_T$ as far as the form diameter $D_{FF}$. The major diameter $D_{KW}$, the pitch circle diameter $D_T$ and the form diameter $D_{FF}$ are shown with their respective radii. The dimensions are given in mm. The profile run-out 3, by means of its edge, forms an angle α extending in the axial direction.

The Figure shows a profile run-out curve for a SAE profile of type 32/64, 34 teeth, 45° pressure angle, involute teeth on a MB tubular shaft having a 16.0 mm internal bore, with the internal profile being straight-toothed at 45°. The curve as shown is defined in such a way that, as from a load application moment of 1000 Nm, an additional profile region rests uniformly against the teeth and thus, additionally, participates in the transmission of moments. The illustration shows that the curve advantageously rises at an angle of three to four (3°–4°) degrees.

While the above detailed description describes the preferred embodiment of the present invention, the invention is susceptible to modification, variation, and alteration without deviating from the scope and fair meaning of the subjoined claims.

What is claimed is:

1. A connection for the transmission of torque between an internally toothed hub and an externally toothed shaft insertable into the hub, the hub comprising internal teeth and the shaft comprising shaft teeth having a straight region with a full shaft teeth profile with tooth flanks of said full shaft teeth profile extending from a major diameter to a form diameter, said internal teeth and said shaft teeth being provided with different tooth flank profiles such that tooth flanks of the shaft teeth rest against tooth flanks of the hub internal teeth on a pitch circle diameter and such that off of that pitch circle a clearance is formed between the tooth flanks in a circumferential direction;

said shaft teeth, at its end directed towards a shaft shank, including a run-out region with a tooth height decreasing as a function of axial direction and said run-out region changes from a tooth height ($h_{ZT}$) delimited by the pitch circle diameter of the full shaft teeth profile to no less than the tooth form diameter of the full shaft teeth profile and the length of said run-out region of the shaft teeth is axially substantially positioned within the length of the internal hub teeth and when the shaft is under torque, along the length of the run-out region, the height of the point of contact between the shaft teeth and the hub teeth decreases along the length of the shaft.

2. A connection according to claim 1, wherein said internal hub teeth are straight flanked teeth and the external shaft teeth are involute toothing.

3. A connection according to claim 1, wherein said run-out region is at a run-out angle (α) of 10° maximum relative to the longitudinal axis of the shaft.

4. A connection according to claim 1, wherein said shaft teeth include a base diameter which is equal to or greater than a shaft diameter of the shaft shank, adjoining the run-out portion as a smooth shaft.

* * * * *